US008446885B2

(12) United States Patent
Chin et al.

(10) Patent No.: US 8,446,885 B2
(45) Date of Patent: May 21, 2013

(54) METHOD AND APPARATUS OF FAST SYSTEM SELECTION IN THE TD-SCDMA AND GSM MULTIMODE TERMINAL

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 12/846,674

(22) Filed: Jul. 29, 2010

(65) Prior Publication Data
US 2011/0243119 A1    Oct. 6, 2011

Related U.S. Application Data

(60) Provisional application No. 61/320,962, filed on Apr. 5, 2010.

(51) Int. Cl.
*H04B 7/216*  (2006.01)
*H04J 4/00*  (2006.01)
*H04W 72/00*  (2009.01)

(52) U.S. Cl.
USPC ........... 370/335; 370/342; 370/345; 370/478; 455/464

(58) Field of Classification Search
USPC ...... 370/310–350, 395.5, 400–401, 441–442, 370/478–480, 498; 455/431–466
See application file for complete search history.

(56) References Cited

U.S. PATENT DOCUMENTS

| 2004/0109431 | A1 | 6/2004 | Abrahamson et al. |
| 2006/0045069 | A1 | 3/2006 | Zehavi et al. |
| 2006/0094427 | A1 | 5/2006 | Buckley et al. |
| 2008/0181188 | A1* | 7/2008 | Aghvami et al. ............. 370/338 |
| 2010/0136967 | A1* | 6/2010 | Du et al. .................... 455/432.3 |
| 2010/0330986 | A1* | 12/2010 | Rahman et al. ........... 455/432.1 |
| 2011/0003590 | A1* | 1/2011 | Yoon et al. ................ 455/432.1 |
| 2011/0194530 | A1* | 8/2011 | Tinnakornsrisuphap et al. ............................ 370/331 |
| 2012/0020325 | A1* | 1/2012 | Swamy et al. ............... 370/331 |
| 2012/0058762 | A1* | 3/2012 | Buckley et al. .............. 455/434 |

FOREIGN PATENT DOCUMENTS
EP          1303152 A1    4/2003

OTHER PUBLICATIONS

International Search Report and Written Opinion—PCT/US2011/031295—ISA/EPO—Jun. 20, 2011.

\* cited by examiner

*Primary Examiner* — Tri H Phan
(74) *Attorney, Agent, or Firm* — Kristine U. Ekwueme

(57) ABSTRACT

Certain aspects of the present disclosure propose techniques and apparatus of fast system selection for a multimode terminal that can support both Time Division Synchronous Code Division Multiple Access (TD-SCDMA) technology and Global System for Mobile communications (GSM) technology.

28 Claims, 6 Drawing Sheets

METHOD AND APPARATUS OF FAST SYSTEM SELECTION IN THE TD-SCDMA AND GSM MULTIMODE TERMINAL

CLAIM OF PRIORITY UNDER 35 U.S.C. §119

This application claims the benefit of U.S. Provisional Patent Application No. 61/320,962 entitled: "Method and Apparatus of Fast System Selection in the TD-SCDMA and GSM Multimode Terminal," filed on Apr. 5, 2010, the disclosure of which is expressly incorporated by reference herein in its entirety.

BACKGROUND

1. Field

Aspects of the present disclosure relate generally to wireless communications, and more particularly, to a method and apparatus of fast system selection for a multimode terminal that supports both Time Division Synchronous Code Division Multiple Access (TD-SCDMA) technology and Global System for Mobile communications (GSM) technology.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but also to advance and enhance the user experience with mobile communications.

SUMMARY

Certain aspects of the present disclosure provide a method of wireless communication. The method generally includes performing a first scan for at least one mobile network identifier (MNI) of a first radio access technology (RAT), and performing a second scan for at least one MNI of a second RAT, wherein at least a portion of the first scan and at least a portion of the second scan are performed concurrently.

Certain aspects of the present disclosure provide an apparatus for wireless communication. The apparatus generally includes means for performing a first scan for at least one mobile network identifier (MNI) of a first radio access technology (RAT), and means for performing a second scan for at least one MNI of a second RAT, wherein at least a portion of the first scan and at least a portion of the second scan are performed concurrently.

Certain aspects of the present disclosure provide a computer program product. The computer program product generally includes a computer-readable medium comprising code for performing a first scan for at least one mobile network identifier (MNI) of a first radio access technology (RAT), and performing a second scan for at least one MNI of a second RAT, wherein at least a portion of the first scan and at least a portion of the second scan are performed concurrently.

Certain aspects of the present disclosure provide an apparatus for wireless communication. The apparatus generally includes at least one processor, and a memory coupled to the at least one processor, wherein the at least one processor is configured to perform a first scan for at least one mobile network identifier (MNI) of a first radio access technology (RAT), and perform a second scan for at least one MNI of a second RAT, wherein at least a portion of the first scan and at least a portion of the second scan are performed concurrently.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
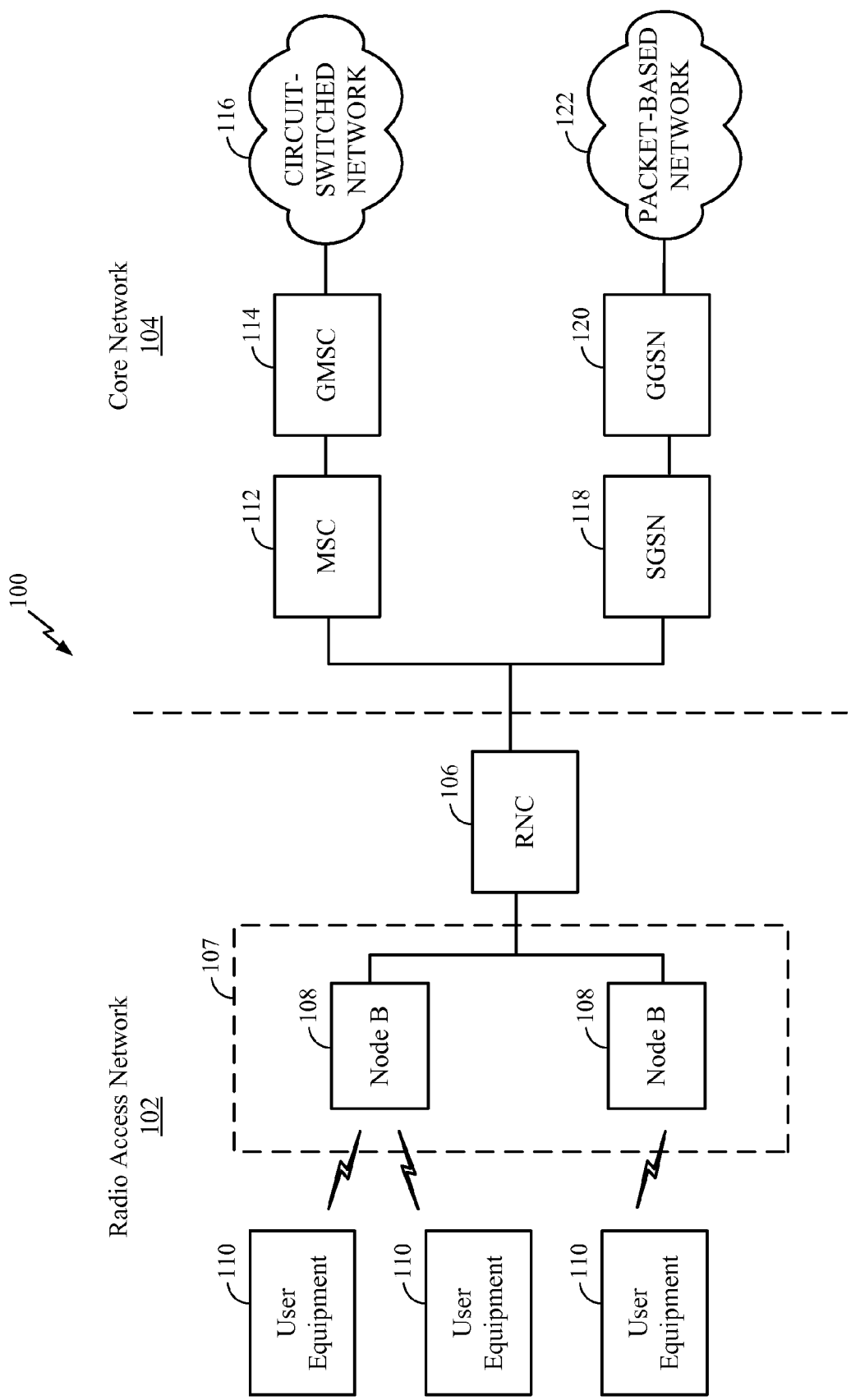
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
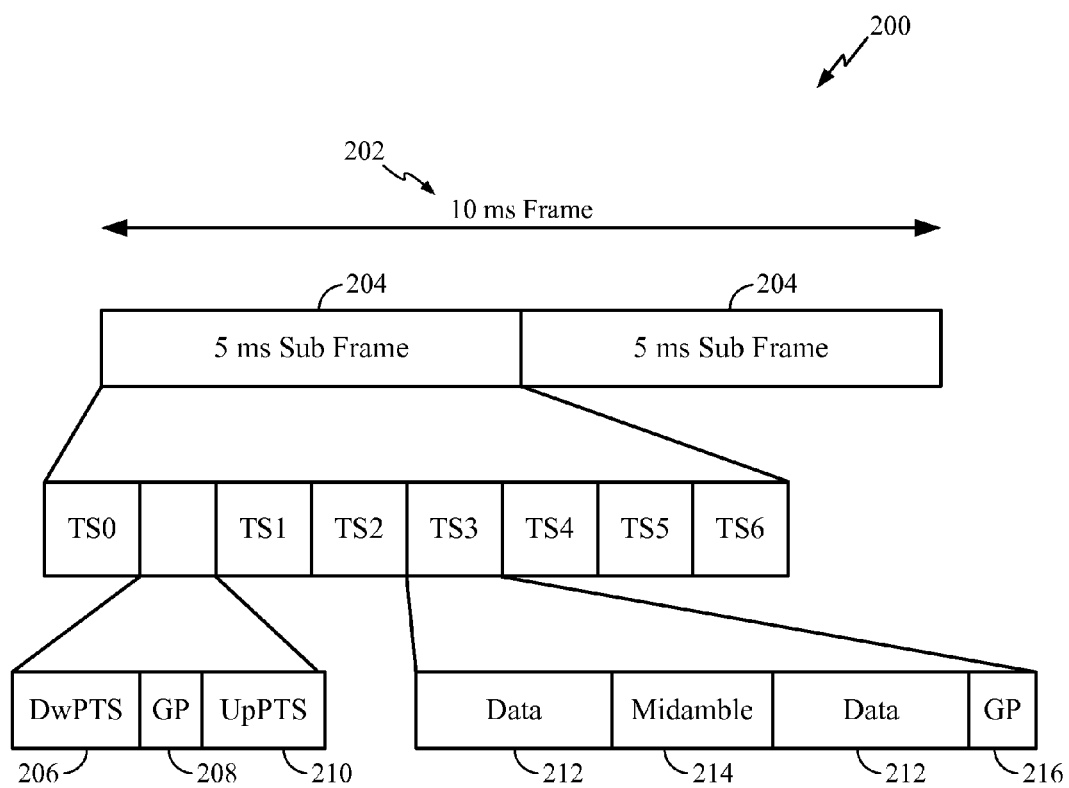
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
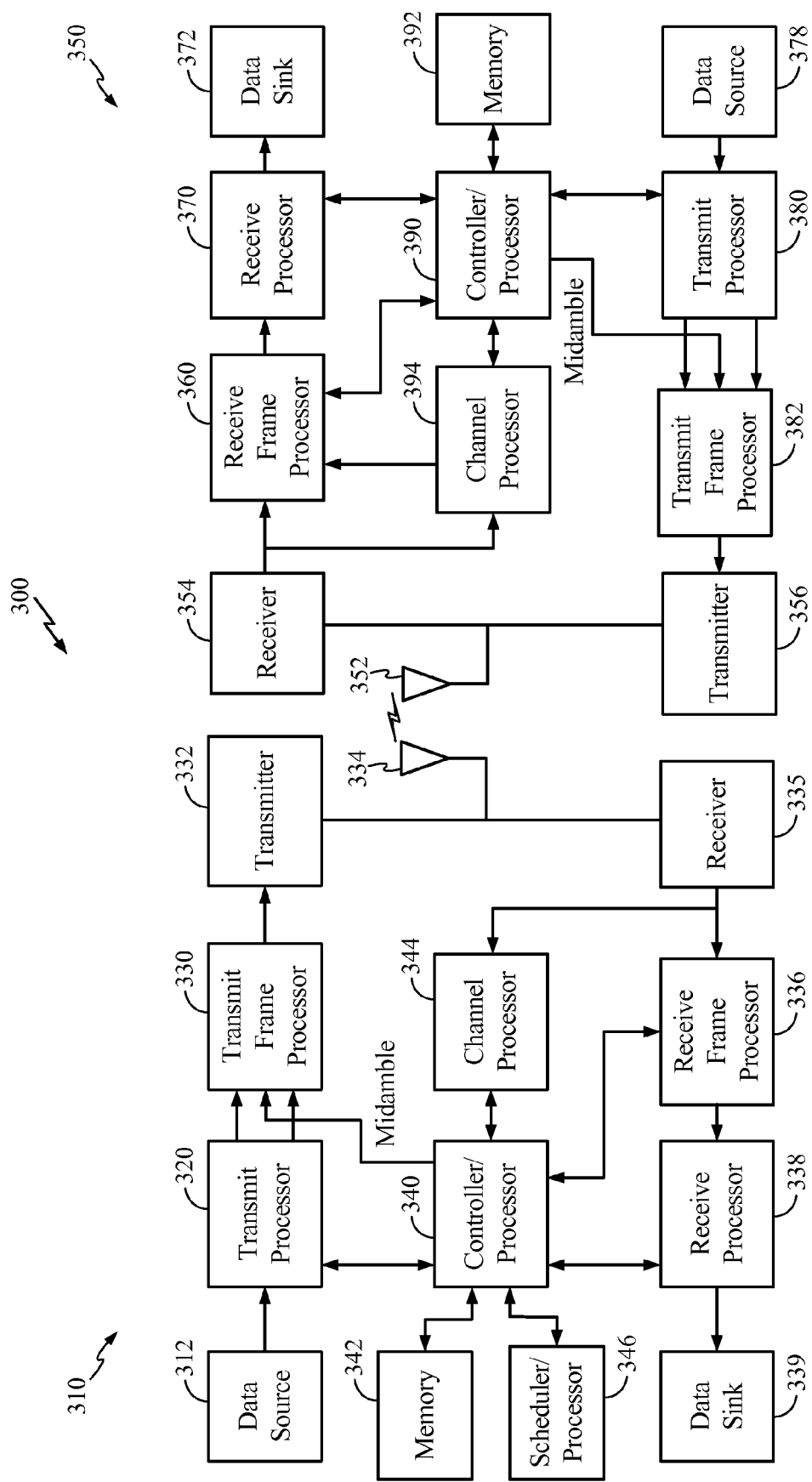
FIG. 3 is a block diagram conceptually illustrating an example of a Node B in communication with a user equipment (UE) in a telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

Multimode Terminal with Both TD-SCDMA and GSM Coverage

Figure 4:
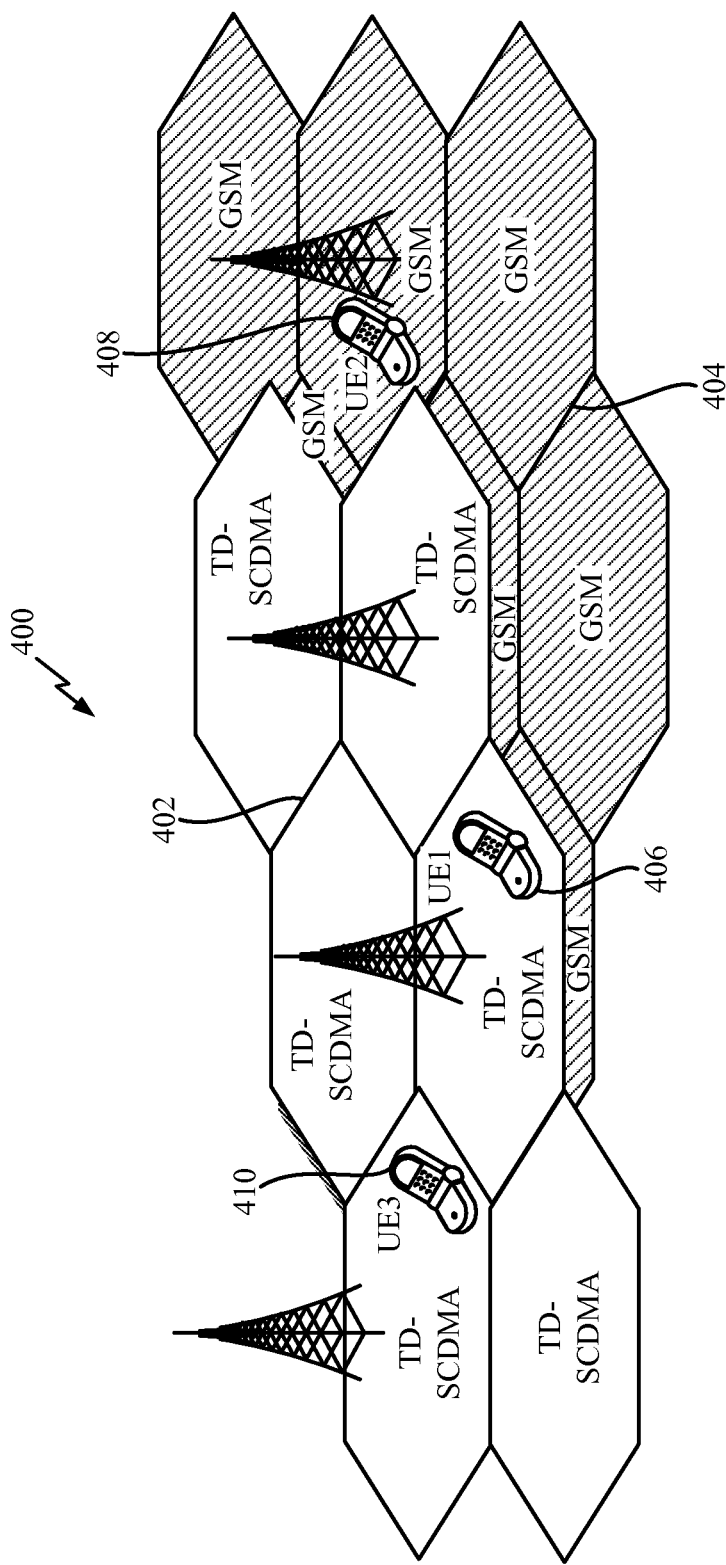
FIG. 4 illustrates an example topology of Time Division Synchronous Code Division Multiple Access (TD-SCDMA) coverage and Global System for Mobile communications (GSM) coverage in accordance with certain aspects of the present disclosure.

In the migration from GSM radio access technology (RAT) to TD-SCDMA RAT, a UE (e.g., the UE 350 illustrated in FIG. 3) may have radio coverage for both GSM and TD-SCDMA RATs in some location, as in an exemplary network topology 400 illustrated in FIG. 4. FIG. 4 illustrates the example topology 400 of TD-SCDMA network coverage 402 and GSM network coverage 404 in accordance with certain aspects of the present disclosure. For example, a UE 406 may experience both the GSM coverage 404 and the TD-SCDMA coverage 402. On the other hand, a UE 408 may be only within the GSM coverage 404, and a UE 410 may be only within the TD-SCDMA coverage 402.

A mobile terminal (e.g., the UE 406 from FIG. 4) may comprise hardware and protocol stacks of both GSM and TD-SCDMA RATs. In one aspect, the UE hardware configuration may comprise a simultaneous hybrid configuration in which the UE may only comprise two independent radio frequency (RF) chains and a baseband modem hardware. The UE may be active transmitting or receiving through either TD-SCDMA, or GSM, or both of these RATs at any time. In another aspect, the UE hardware configuration may comprise a dual receiver where the UE may be able to receive GSM and TD-SDCMA signals simultaneously.

Typically, the UE may scan/search and select a system in the following situations. Upon the power up, the UE may scan radio signals and select an initial system. Upon the loss of coverage of existing system, the UE may scan radio signals and select an available system. Further, if the currently acquired system is not a preferred system, the UE may periodically scan and search for a better system.

Each UMTS system may be identified by a PLMN (Public Land Mobile Network) Identifier (ID), consisting of MCC (Mobile Country Code) and MNC (Mobile Network Code). The MCC may comprise three digits for identifying uniquely a country of the mobile subscriber, and the MNC may comprise two or three digits for identifying GSM/UMTS applications.

An USIM (Universal Subscriber Identity Module) in the UE may store information of PLMN database of system selection. The PLMN database may be organized in Elementary Files (EFs) in the USIM. For example, in one aspect, an Elementary File (EF) may be a "Home PLMN (HPLMN) Selector with Access Technology" EF (i.e., $EF_{HPLMNwAcT}$), which may comprise a list of home PLMN IDs and their associated radio access technologies in a priority order. In another aspect, the EF may be an "Operator controlled PLMN Selector with Access Technology" EF (i.e., $EF_{HPLMNwAcT}$) 5 which may comprise operator provisioned (non-home) PLMN IDs and their associated radio access technologies in a priority order.

However, it may be a very time consuming process for the mobile terminal to scan/search and select a system. The present disclosure proposes an enhancement for the mobile terminal to speed up the scan/search and system selection process when the UE comprises both the TD-SCDMA and GSM modules that can allow simultaneous reception.

Method and Apparatus of Fast System Selection for Multimode Terminal

Certain aspects of the present disclosure support that a UE may turn on both available TD-SCDMA and GSM modules to concurrently perform scan/search in order to speed up the system selection process. The system selection may be performed prior to completion of at least one of the concurrent scans. The present disclosure further proposes utilizing a flag stored in a non-volatile memory of the UE that indicates the RAT preference of system selection, i.e., the GSM preference, TD-SCDMA preference, or no preference. The present disclosure proposes the following system selection rules, which may depend on the preferred RAT.

In one aspect of the present disclosure, the GSM may be the preferred RAT. If the GSM module has identified a PLMN ID in the "HPLMN Selector with Access Technology" EF, then the system selection may complete and therefore the home PLMN acquired by the GSM module may represent the selected system. After the system has been selected, if the TD-SCDMA module still continues to search/scan, then the TD-SCDMA selection process may be halted immediately.

On the other hand, if the GSM module has completed all possible search/scan operations and cannot identify a PLMN ID in the "HPLMN Selector with Access Technology" EF, and the TD-SCDMA module has found a PLMN ID in the "HPLMN Selector with Access Technology" EF, then the home PLMN acquired by the TD-SCDMA module may represent the selected system.

If both the GSM and TD-SCDMA modules have completed the search/scan but cannot identify any PLMN ID in the "HPLMN Selector with Access Technology" EF, then the highest priority non-home (provisioned) PLMNs acquired by the GSM and TD-SCDMA modules may be compared and one of them may be selected as follows. If the non-home PLMN acquired by the GSM module has higher priority than the non-home PLMN acquired by the TD-SCDMA module, then the PLMN acquired by the GSM module may be selected. If the non-home PLMN acquired by the GSM module has lower priority than that acquired by the TD-SCDMA module, then the PLMN acquired by the TD-SCDMA module may be selected. If the non-home PLMN acquired by the GSM module has the same priority as that acquired by TD-SCDMA module, then the PLMN acquired by the GSM module may be selected.

In another aspect of the present disclosure, the memory flag may indicate that the TD-SCDMA may be the preferred RAT. If the TD-SCDMA module has identified a PLMN ID in the "HPLMN Selector with Access Technology" EF, then the system selection may complete, and therefore the home PLMN acquired by the TD-SCDMA module may represent the selected system. If the GSM module still continues to search/scan, then the GSM selection process may be halted immediately.

On the other hand, if the TD-SCDMA module has completed all possible search/scan operations and cannot identify a PLMN ID in the "HPLMN Selector with Access Technology" EF, and the GSM module has found a PLMN ID in the "HPLMN Selector with Access Technology" EF, then the home PLMN acquired by the GSM module may represent the selected system.

If both the GSM and TD-SCDMA modules have completed the search/scan but cannot identify any PLMN ID in the "HPLMN Selector with Access Technology" EF, then the highest priority non-home (provisioned) PLMNs acquired by the GSM and TD-SCDMA modules may be compared and one of them may be selected as follows. If the non-home PLMN acquired by the GSM module has higher priority than the non-home PLMN acquired by the TD-SCDMA module, then the PLMN acquired by the GSM module may be selected. If the non-home PLMN acquired by the GSM module has lower priority than that acquired by the TD-SCDMA module, then the PLMN acquired by the TD-SCDMA module may be selected. If the non-home PLMN acquired by the GSM module has the same priority as that acquired by the TD-SCDMA module, then the PLMN acquired by the TD-SCDMA module may be selected.

In yet another aspect of the present disclosure, there may be no preferred RAT. In this case, if the GSM module has identified a PLMN ID in the "HPLMN Selector with Access Technology" EF, then the system selection may complete and therefore the home PLMN acquired by the GSM module may represent the selected system. If the TD-SCDMA module still continues to search/scan, then the TD-SCDMA selection process may be halted immediately.

On the other hand, if the TD-SCDMA module has identified a PLMN ID in the "HPLMN Selector with Access Technology" EF, then the system selection may complete, and therefore the home PLMN acquired by the TD-SCDMA module may represent the selected system. If the GSM module still continues to search/scan, then the GSM selection process may be halted immediately.

If both the GSM and TD-SCDMA modules have completed the search/scan but cannot identify any PLMN ID in the "HPLMN Selector with Access Technology" EF, then the highest priority non-home (provisioned) PLMNs acquired by the GSM and TD-SCDMA modules may be compared and one of them may be selected as follows. If the non-home PLMN acquired by the GSM module has higher priority than that acquired by the TD-SCDMA module, then the PLMN acquired by the GSM module may be selected. If the non-home PLMN acquired by the GSM module has lower priority than that acquired by the TD-SCDMA module, then the PLMN acquired by the TD-SCDMA module may be selected. If the non-home PLMN acquired by the GSM module has the same priority as that acquired by the TD-SCDMA module, then the highest priority PLMN acquired by the TD-SCDMA or GSM module may be arbitrarily chosen for the system being selected. Alternatively, a PLMN with better-received signal may be selected.

Figure 5:
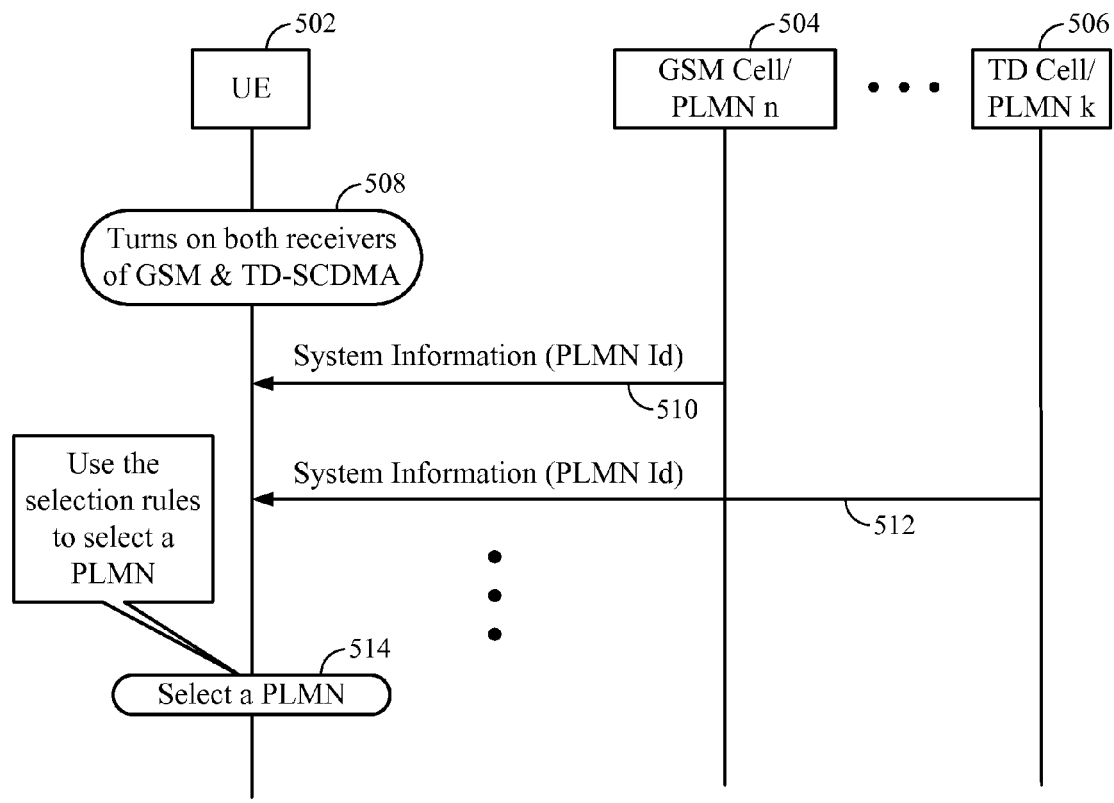
FIG. 5 illustrates an example communication between a multimode UE, a TD-SCDMA cell and a GSM cell in accordance with certain aspects of the present disclosure.

FIG. 5 illustrates the above proposed system selection process. A multimode UE 502 may be located in a coverage area of a GSM cell 504 and a TD-SCDMA cell 506 with their associated PLMN IDs. Other TD-SCDMA cells, GSM cells and cells based on some other RAT may be also present. At a time instant 508, the UE 502 may turn on both the GSM-based receiver and the TD-SCDMA-based receiver. Then, the UE 502 may be able to acquire system information 510 with the PLMN ID associated with the GSM cell 504, as well as system information 512 with the PLMN ID associated with the TD-SCDMA cell 506. Other system information from other cells may be also acquired at the UE 502. Based on the proposed selection rules, the UE 502 may select, at a time instant 514, one of the acquired PLMN IDs and a corresponding communication system.

Figure 6:
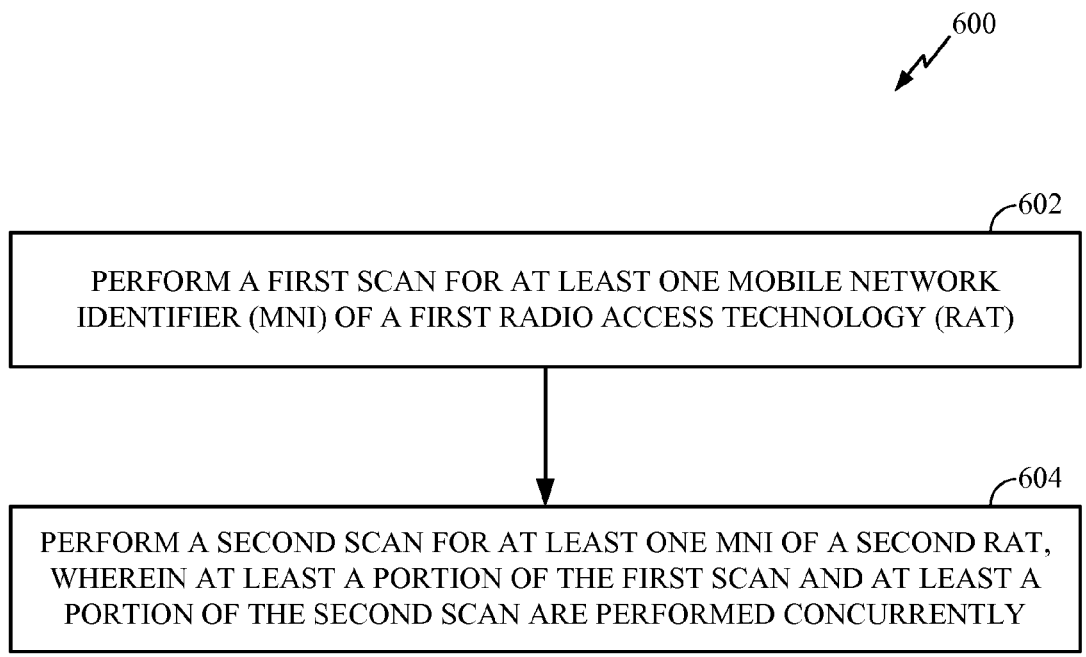
FIG. 6 is a functional block diagram conceptually illustrating example blocks executed at a UE to implement the functional characteristics of one aspect of the present disclosure.

FIG. 6 is a functional block diagram conceptually illustrating example blocks executed at a UE to implement the functional characteristics of one aspect of the present disclosure. Operations illustrated by the blocks 600 may be executed, for example, by the processors 370 and 380 of the UE 350 from FIG. 3. In block 602, the UE may perform a first scan for at least one mobile network identifier (MNI) of a first RAT. In addition, in block 604, the UE may perform a second scan for at least one MNI of a second RAT, wherein at least a portion of the first scan and at least a portion of the second scan may be performed concurrently.

In one configuration, the apparatus 350 for wireless communication includes means for performing a first scan for at least one MNI of a first RAT, and means for performing a second scan for at least one MNI of a second RAT, wherein at least a portion of the first scan and at least a portion of the second scan are performed concurrently. In one aspect, the aforementioned means may be the processors 370 and 380 configured to perform the functions recited by the aforementioned means. In another aspect, the aforementioned means may be a module or any apparatus configured to perform the functions recited by the aforementioned means.

In summary, certain aspects of the present disclosure enhance TD-SCDMA/GSM multimode mobile terminal to scan/search a wireless system concurrently on both RATs. The proposed approach may speed up the system selection process.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
performing a first scan for at least one mobile network identifier (MNI) of a first radio access technology (RAT);
performing a second scan for at least one MNI of a second RAT, wherein at least a portion of the first scan and at least a portion of the second scan are performed concurrently;
selecting a MNI identified during the first and/or second scans, the selecting being performed prior to completing the first and/or second scans; and
halting, after selecting the MNI, a scan of the first and second scans that was not completed.

2. The method of claim 1, wherein at least one of the first RAT and the second RAT comprises Time Division Synchronous Code Division Multiple Access (TD-SCDMA) technology.

3. The method of claim 1, wherein at least one of the first RAT and the second RAT comprises Global System for Mobile communications (GSM) technology.

4. The method of claim 1, wherein the MNI comprises a Public Land Mobile Network (PLMN) identifier of a "Home PLMN Selector with Access Technology" Elementary File (EF).

5. The method of claim 1, wherein the MNI comprises a Public Land Mobile Network (PLMN) identifier of an "Operator Controlled PLMN Selector with Access Technology" Elementary File (EF).

6. The method of claim 1, in which the selecting further comprises:
selecting one of the MNIs identified during the first and/or second scans based on which of the first and second RATs is preferred and/or a priority of the MNIs.

7. The method of claim 6, wherein a memory flag indicates which of the first and second RATs is preferred.

8. An apparatus for wireless communication, comprising:
means for performing a first scan for at least one mobile network identifier (MNI) of a first radio access technology (RAT);
means for performing a second scan for at least one MNI of a second RAT, wherein at least a portion of the first scan and at least a portion of the second scan are performed concurrently;
means for selecting a MNI identified during the first and/or second scans, prior to completion of the first and/or second scans; and
means for halting, after selecting the MNI, a scan of the first and second scans that was not completed.

9. The apparatus of claim 8, wherein at least one of the first RAT and the second RAT comprises Time Division Synchronous Code Division Multiple Access (TD-SCDMA) technology.

10. The apparatus of claim 8, wherein at least one of the first RAT and the second RAT comprises Global System for Mobile communications (GSM) technology.

11. The apparatus of claim 8, wherein the MNI comprises a Public Land Mobile Network (PLMN) identifier of a "Home PLMN Selector with Access Technology" Elementary File (EF).

12. The apparatus of claim 8, wherein the MNI comprises a Public Land Mobile Network (PLMN) identifier of an "Operator Controlled PLMN Selector with Access Technology" Elementary File (EF).

13. The apparatus of claim 8, in which the means for selecting further comprises:
means for selecting one of the MNIs identified during the first and/or second scans based on which of the first and second RATs is preferred and/or a priority of the MNIs.

14. The apparatus of claim 13, wherein a memory flag indicates which of the first and second RATs is preferred.

15. A computer program product, comprising a computer-readable medium comprising code for:
performing a first scan for at least one mobile network identifier (MNI) of a first radio access technology (RAT);
performing a second scan for at least one MNI of a second RAT, wherein at least a portion of the first scan and at least a portion of the second scan are performed concurrently;
selecting an MNI identified during the first and/or second scans, the selecting being performed prior to completion of the first and/or second scans; and
halting, after selecting the MNI, a scan of the first and second scans that was not completed.

16. The computer program product of claim 15, wherein at least one of the first RAT and the second RAT comprises Time Division Synchronous Code Division Multiple Access (TD-SCDMA) technology.

17. The computer program product of claim 15, wherein at least one of the first RAT and the second RAT comprises Global System for Mobile communications (GSM) technology.

18. The computer program product of claim 15, wherein the MNI comprises a Public Land Mobile Network (PLMN) identifier of a "Home PLMN Selector with Access Technology" Elementary File (EF).

19. The computer program product of claim 15, wherein the MNI comprises a Public Land Mobile Network (PLMN) identifier of an "Operator Controlled PLMN Selector with Access Technology" Elementary File (EF).

20. The computer program product of claim 15, wherein the code for selecting further comprises code for:

selecting one of the MNIs identified during the first and/or second scans based on which of the first and second RATs is preferred and/or a priority of the MNIs.

21. The computer program product of claim 20, wherein a memory flag indicates which of the first and second RATs is preferred.

22. An apparatus for wireless communication, comprising:
at least one processor; and
a memory coupled to the at least one processor,
wherein the at least one processor is configured to
perform a first scan for at least one mobile network identifier (MNI) of a first radio access technology (RAT),
perform a second scan for at least one MNI of a second RAT, wherein at least a portion of the first scan and at least a portion of the second scan are performed concurrently;
select a MNI identified during the first and/or second scans, the selecting being performed prior to completion of the first and/or second scans; and
halt, after selecting the MNI, a scan of the first and second scans that was not completed.

23. The apparatus of claim 22, wherein at least one of the first RAT and the second RAT comprises Time Division Synchronous Code Division Multiple Access (TD-SCDMA) technology.

24. The apparatus of claim 22, wherein at least one of the first RAT and the second RAT comprises Global System for Mobile communications (GSM) technology.

25. The apparatus of claim 22, wherein the MNI comprises a Public Land Mobile Network (PLMN) identifier of a "Home PLMN Selector with Access Technology" Elementary File (EF).

26. The apparatus of claim 22, wherein the MNI comprises a Public Land Mobile Network (PLMN) identifier of an "Operator Controlled PLMN Selector with Access Technology" Elementary File (EF).

27. The apparatus of claim 22, wherein the at least one processor is also configured to:
select one of MNIs identified during at least one of the first and second scans based on at least one of which of the first and second RATs is preferred or a priority of the MNIs.

28. The apparatus of claim 27, wherein a memory flag indicates which of the first and second RATs is preferred.

* * * * *